(12) United States Patent
Hioki et al.

(10) Patent No.: US 10,983,012 B2
(45) Date of Patent: Apr. 20, 2021

(54) TEMPERATURE SENSOR

(71) Applicant: Murata Manufacturing Co., Ltd., Nagaokakyo (JP)

(72) Inventors: Yasunori Hioki, Nagaokakyo (JP); Hiroshi Marusawa, Nagaokakyo (JP); Michiru Mikami, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 564 days.

(21) Appl. No.: 15/879,951

(22) Filed: Jan. 25, 2018

(65) Prior Publication Data

US 2018/0164162 A1 Jun. 14, 2018

Related U.S. Application Data

(63) Continuation of application No. PCT/JP2016/069240, filed on Jun. 29, 2016.

(30) Foreign Application Priority Data

Jul. 31, 2015 (JP) .............................. JP2015-152506

(51) Int. Cl.
*G01K 7/00* (2006.01)
*G01K 7/22* (2006.01)
(Continued)

(52) U.S. Cl.
CPC ............. *G01K 7/223* (2013.01); *H01C 7/005* (2013.01); *H01C 7/008* (2013.01); *H01C 7/027* (2013.01);
(Continued)

(58) Field of Classification Search
CPC combination set(s) only.
See application file for complete search history.

(56) References Cited

U.S. PATENT DOCUMENTS 7,948,354 B2 5/2011 Miura et al.
9,153,762 B2 10/2015 Miura
(Continued)

FOREIGN PATENT DOCUMENTS

JP S57-35302 A 2/1982
JP S63-60502 A 3/1988
(Continued)

OTHER PUBLICATIONS

International Search Report issued in International Application No. PCT/JP2016/069240, dated Sep. 6, 2016.
(Continued)

*Primary Examiner* — Lisa M Caputo
*Assistant Examiner* — Nasir U. Ahmed
(74) *Attorney, Agent, or Firm* — Arent Fox LLP

(57) ABSTRACT

A temperature sensor that includes a first electrode layer, a second electrode layer, and a thermistor layer between the first and second electrode layers. The thermistor layer includes a spinel-type semiconductor ceramic composition powder containing Mn, Ni, and Fe, and an organic polymer component. In the semiconductor ceramic composition powder, the molar ratio of Mn to Ni is 85/15≥Mn/Ni≥65/35, and when the total molar quantity of Mn and Ni is 100 parts by mole, the content of Fe is 30 parts by mole or less, and the semiconductor ceramic composition powder is 2 μm or less in particle size.

12 Claims, 3 Drawing Sheets

(51) Int. Cl.
*H01C 17/065* (2006.01)
*H01C 7/04* (2006.01)
*H01C 7/02* (2006.01)
*H01C 7/00* (2006.01)
*H01C 17/28* (2006.01)
*H01C 1/142* (2006.01)

(52) U.S. Cl.
CPC ....... *H01C 7/049* (2013.01); *H01C 17/06526* (2013.01); *H01C 17/06553* (2013.01); *H01C 17/06586* (2013.01); *H01C 17/281* (2013.01); *H01C 1/142* (2013.01); *H01C 7/02* (2013.01); *H01C 7/04* (2013.01)

(56) References Cited

U.S. PATENT DOCUMENTS

| | | | | |
|---|---|---|---|---|
| 2008/0176048 | A1* | 7/2008 | Onizawa | C08L 67/02 428/195.1 |
| 2009/0167482 | A1 | 7/2009 | Tadamasa et al. | |
| 2010/0266845 | A1* | 10/2010 | Ohsaki | C01F 5/06 428/402 |
| 2013/0187748 | A1* | 7/2013 | Sha | H01C 7/008 338/22 R |
| 2013/0235507 | A1* | 9/2013 | Aikawa | C04B 35/58 361/234 |
| 2013/0328154 | A1 | 12/2013 | Miura | |

FOREIGN PATENT DOCUMENTS

| | | |
|---|---|---|
| JP | 869902 A | 3/1996 |
| JP | 2004-31795 A | 1/2004 |
| JP | 2004-311588 A | 11/2004 |
| JP | 2005-32996 A | 2/2005 |
| JP | 2010-237065 A | 10/2010 |
| WO | 2006085507 A1 | 8/2006 |
| WO | WO 2012/035494 A1 | 3/2012 |
| WO | WO 2012/114874 A1 | 8/2012 |

OTHER PUBLICATIONS

Written Opinion of the International Searching Authority issued in International Application No. PCT/JP2016/069240, dated Sep. 6, 2016.

* cited by examiner

TEMPERATURE SENSOR

CROSS REFERENCE TO RELATED APPLICATIONS

The present application is a continuation of International application No. PCT/JP2016/069240, filed Jun. 29, 2016, which claims priority to Japanese Patent Application No. 2015-152506, filed Jul. 31, 2015, the entire contents of each of which are incorporated herein by reference.

FIELD OF THE INVENTION

The present invention relates to a temperature sensor.

BACKGROUND OF THE INVENTION

Temperature sensors such as a positive temperature coefficient thermistor (PTC thermistor) and a negative temperature coefficient thermistor (NTC thermistor) are widely used in applications for temperature compensation, temperature detection, and the like.

For example, Patent Document 1 discloses a method for manufacturing a temperature detection device, which includes forming at least one silicon layer and at least one electrode or contact so as to define a thermistor structure, where at least the silicon layer is formed by printing, and at least one of the silicon layer and at least one electrode or contact is supported by a substrate during the application of the silicon layer by printing.

Patent Document 2 discloses a temperature sensor characterized in that the temperature sensor is configured to use, as a temperature sensing element, a compact obtained by binding, with an organic polymer material, a conductive powder containing at least one semiconductor material selected from an oxide sintered body with a spinel structure containing at least nickel and/or cobalt and manganese, semiconductive zirconia, and silicon carbide, and provide the temperature sensing element with a pair of electrodes.

Patent Document 1: International Publication No. WO 12/035494

Patent Document 2: Japanese Patent Application Laid-Open No. 63-060502

SUMMARY OF THE INVENTION

In recent years, temperature sensors with higher B constants (thermistor constants) have been required with the reduction in size and the increase in performance for electronic devices. The B constant is expressed by the following formula:

$$B=(\ln R - \ln R_0)/(1/T - 1/T_0)$$

(R: resistance at ambient temperature T (K), $R_0$: resistance at ambient temperature $T_0$ (K))

In this specification, unless otherwise specified, the "B constant" means a B constant $B_{25/50}$ at T=50° C. and $T_0$=25° C.

In addition, in recent years, film-type temperature sensors formed by printing with a thermistor material on a flexible substrate such as a resin film have been developed progressively. The thermistor material usually includes a semiconductor ceramic composition powder which has thermistor characteristics, and an organic polymer component. In the film-type temperature sensors, it is necessary for the thermistor material formed on the flexible substrate to have flexibility (flexibility). At the same time, the amount of the semiconductor ceramic composition included in the thermistor material is required to be increased in order to improve the thermistor characteristics of the film-type temperature sensors. In order to improve the flexibility of the thermistor material and to increase the amount of the semiconductor ceramic composition included in the thermistor material, it is necessary to make the powder of the semiconductor ceramic composition fine.

An object of the present invention is to provide a temperature sensor which has a high B constant and excellent flexibility.

The inventors have found that the use of a semiconductor ceramic composition powder that contains Mn, Ni and Fe in specific proportions and has a specific average particle size makes it possible to obtain a temperature sensor with a high B constant and excellent flexibility, thereby completing the present invention.

According to a first aspect of the present invention, a temperature sensor is provided which includes a first electrode layer, a second electrode layer, and a thermistor layer between the first electrode layer and the second electrode layer. The thermistor layer include a spinel-type semiconductor ceramic composition powder containing Mn, Ni, and Fe, and an organic polymer component. In the semiconductor ceramic composition powder, a molar ratio of Mn to Ni is 85/15≥Mn/Ni≥65/35, and when a total molar quantity of Mn and Ni is 100 parts by mole, a content of Fe is 30 parts by mole or less, and the semiconductor ceramic composition powder is 2 μm or less in average particle size.

According to a second aspect of the present invention, a method for manufacturing a temperature sensor is provided. The method includes grinding a raw material mixture containing powders of a Mn source, a Ni source, and a Fe source, where a molar ratio of Mn to Ni is 85/15≥Mn/Ni≥65/35, and when a total molar quantity of Mn and Ni is regarded as 100 parts by mole, a content of Fe is 30 parts by mole or less; subjecting the ground raw material mixture to a heat treatment at a temperature of 700° C. to 900° C. to obtain a semiconductor ceramic composition; grinding the semiconductor ceramic composition to obtain a semiconductor ceramic composition powder of 2 μm or less in average particle size; preparing a thermistor layer paste including the semiconductor ceramic composition powder and an organic polymer component; and applying an electrode layer paste and the thermistor layer paste onto a flexible substrate to obtain a temperature sensor including a first electrode layer, a second electrode layer, a thermistor layer between the first electrode layer and the second electrode layer, and the flexible substrate.

According to the present invention, it is possible to provide a temperature sensor which has a high B constant and excellent flexibility.

DETAILED DESCRIPTION OF THE INVENTION

Figure 1A:
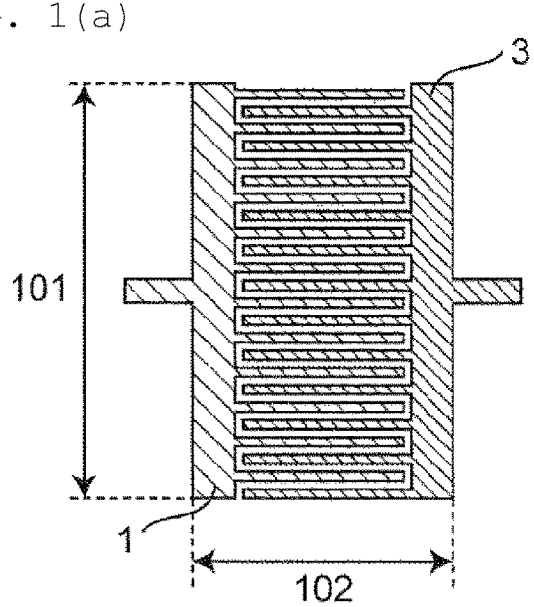
FIGS. 1(a) to 1(c) are diagrams schematically illustrating an example of a temperature sensor according to an embodiment of the present invention.

A temperature sensor and a manufacturing method therefor according to an embodiment of the present invention will be described in detail below with reference to the drawings. However, the shape, configuration, and the like of the temperature sensor and the respective constituent elements according to the present invention are not to be considered limited to the embodiment described below and the configurations shown in the drawings.

Figure 1B:
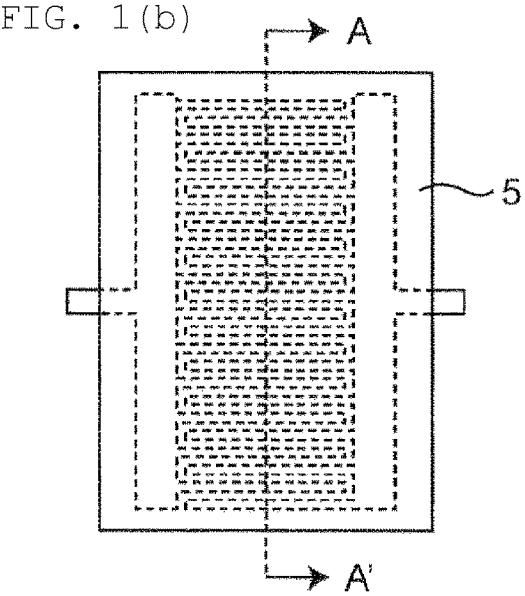
Figure 1C:
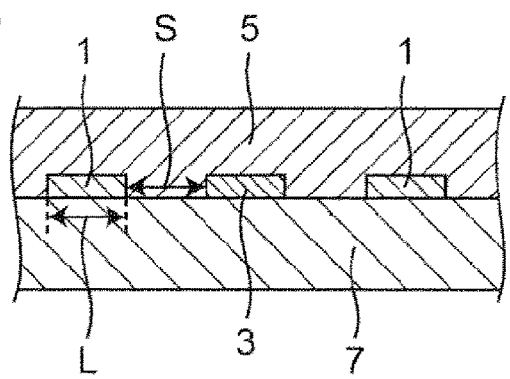
Figure 2A:
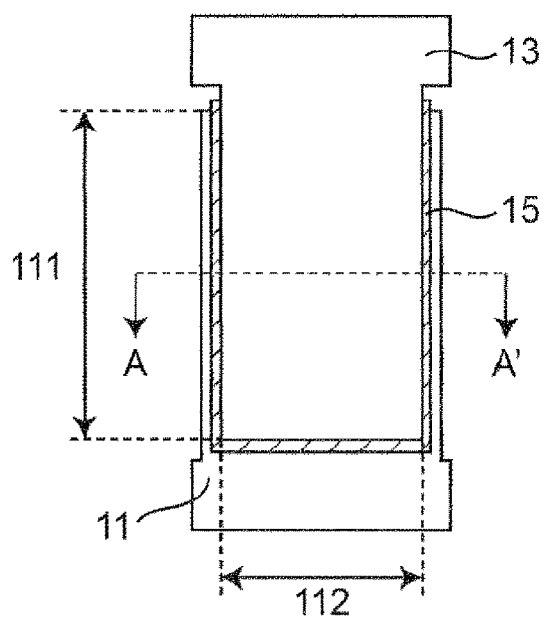
FIGS. 2(a) and 2(b) are diagrams schematically illustrating another example of a temperature sensor according to an embodiment of the present invention.
Figure 2B:
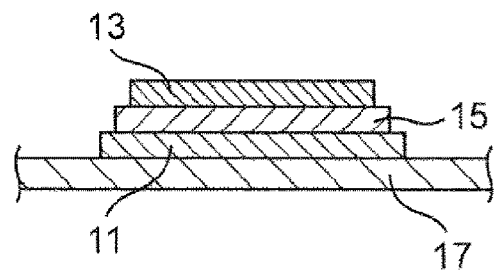

A temperature sensor according to an embodiment of the present invention includes a thermistor layer including a spinel-type semiconductor ceramic composition powder containing Mn, Ni and Fe, and an organic polymer component; and a pair of electrode layers. FIGS. 1(a) to 1(c) schematically show an example of a temperature sensor according to an embodiment of the present invention. FIG. 1(a) is a plan view illustrating an example of the pair of electrode layers 1 and 3 in the temperature sensor according to the present embodiment. FIG. 1(b) is a plan view illustrating the thermistor layer 5 disposed on the electrode layers 1 and 3 shown in FIG. 1(a). FIG. 1(c) is a partially enlarged view of the cross section taken along the line A-A' of the temperature sensor in FIG. 1(b). In the example shown in FIGS. 1(a) to 1(c), the pair of electrode layers 1 and 3 is arranged on a flexible substrate 7. The pair of electrode layers 1 and 3 may have a comb-shape shape as shown in FIG. 1(a), but the shapes of the electrode layers according to the present invention are not to be considered limited to the foregoing shape, and may have a sandwich structure as shown in FIGS. 2(a) and 2(b). When the electrode layers 1 and 3 have a comb-like shape, the pair of electrode layers 1 and 3 can be formed simultaneously on the flexible substrate 7 by printing with an electrode layer paste once, and the number of steps can be thus reduced. Each of the electrode layers 1 and 3 has a plurality of electrode wires. The electrode wires of one electrode layer 1 and the electrode wires of the other electrode layer 3 are alternately arranged to be spaced from each other, thereby making the electrode layer 1 and the electrode layer 3 opposed to each other. The lengths of a long side 101 and a short side 102 of the electrode layer, the width L of the electrode wire, and the distance S between the electrode wires can be appropriately set depending on the intended use.

A thermistor layer 5 is disposed on the electrode layers 1 and 3 shown in FIG. 1(a). The thermistor layer 5 is, as shown in FIG. 1(c) present between the electrode wires of one electrode layer 1 and the electrode wires of the other electrode layer 3. The temperature sensor according to the present embodiment can be obtained by disposing the electrode layers 1 and 3 and the thermistor layer 5 in this way.

FIGS. 2(a) and 2(b) schematically show another example of a temperature sensor according to one embodiment of the present invention. FIG. 2(a) is a plan view illustrating another example of a pair of electrode layers 11 and 13 in the temperature sensor according to the present embodiment. FIG. 2(b) is a cross-sectional view taken along the line A-A' of the temperature sensor in FIG. 2(a). The temperature sensor shown in FIGS. 2(a) and 2(b) has the electrode layer 11, a thermistor layer 15, and the electrode layer 13 stacked in this order on the flexible substrate 17, and has a sandwich structure of one electrode layer 11 and the other electrode layer 13 stacked with the layer 15 interposed therebetween, thereby making the pair of electrode layers opposed to each other. In FIGS. 2(a) and 2(b), the thermistor layer 15 is formed such that three sides thereof are arranged inside the electrode layer 11 in plan view, and the electrode layer 13 is formed such that its three sides thereof are arranged inside the thermistor layer 15 in plan view. However, the configuration of the temperature sensor according to the present invention is not to be considered limited to this configuration, and any configuration can be adopted as long as one electrode layer 11 and the other electrode layer 13 are spaced apart from each other with the thermistor layer 15 interposed therebetween. The dimensions of a part with one electrode layer 11 and the other electrode layer 13 opposed with the thermistor layer interposed therebetween, that is, the lengths of the long side 111 and short side 112 of the foregoing can be appropriately set depending on the intended use.

The thermistor layer includes the spinel-type semiconductor ceramic composition powder containing Mn, Ni and Fe, and the organic polymer component. In the semiconductor porcelain composition powder, the molar ratio of Mn to Ni is $85/15 \geq Mn/Ni \geq 65/35$, and when the total molar quantity of Mn and Ni is regarded as 100 parts by mole, the Fe content is 30 parts by mole or less. The semiconductor ceramic composition powder according to the present embodiment has the composition mentioned above, and thus has a spinel structure, and has a low abundance of different phase. In the semiconductor ceramic composition powder according to the present embodiment, there is preferably substantially no different phase. The semiconductor ceramic composition powder described above has a high B constant. Therefore, even when the content of the semiconductor ceramic composition powder in the thermistor layer is low, a temperature sensor with a large value of B constant can be obtained. In addition, because of the low abundance of different phase in the semiconductor ceramic composition powder, a temperature sensor can be obtained which varies little in the value of the B constant.

The semiconductor ceramic composition powder preferably further contains one or more selected from the group consisting of Co, Ti and Al. In this case, when the total molar quantity of Mn and Ni is regarded as 100 parts by mole, the total content of Co, Ti, and Al is preferably 2.0 parts by mole or more and 60 parts by mole or less. The semiconductor ceramic composition powder further contains one or more selected from the group consisting of Co, Ti, and Al, thereby making it possible to obtain a temperature sensor which has desired thermistor characteristics with a large B constant and a small variation in B constant. The semiconductor ceramic composition powder may further contain Zn (e.g., ZnO), Cu (e.g., CuO, $CuCO_3$), Zr (e.g., $ZrO_2$) and the like, in addition to the metal elements described above.

The average particle diameter of the semiconductor ceramic composition powder is preferably 2 μm or less. When the average particle diameter of the semiconductor ceramic composition powder falls within the range described above, the connection between the powders of the semiconductor ceramic composition can be formed in an efficient manner in the thermistor layer, and the conductive path (percolation path) can be formed in an efficient manner. As a result, even when the content of the semiconductor ceramic composition powder in the thermistor layer is low, a temperature sensor can be obtained which has excellent thermistor characteristics. Furthermore, the variation in B constant can be reduced. Specifically, for example, a temperature sensor can be obtained which has a B constant of 2500 K or higher and a variation in B constant within ±2.5%. The method for calculating the variation in B constant will be described later.

In addition, when the average particle size of the semiconductor ceramic composition powder is 2 μm or less, the content of the semiconductor ceramic composition powder in the thermistor layer can be reduced, and the content of the organic polymer component in the thermistor layer can be thus increased. As a result, the flexibility of the thermistor layer is improved, and even when the temperature sensor is bent, cracks and the like in the thermistor layer can be prevented from being generated, thereby making it possible to function as a temperature sensor. Furthermore, when the average particle size is 2 μm or less, the thickness of the thermistor layer can be reduced, and the flexibility of the thermistor layer can be further improved. In addition, when the average particle size is 2 μm or less, it is possible to form the thermistor layer by a printing technique such as screen printing. The average particle size of the semiconductor ceramic composition powder is more preferably 0.4 μm or more and 1.5 μm or less. As the semiconductor ceramic composition powder according to the present embodiment, one type of powder that has a predetermined average particle size may be used, or two or more types of powders that have different average particle sizes may be used in combination. In addition, the semiconductor ceramic composition powder according to the present embodiment may have a unimodal particle size distribution, or may have a multimodal particle size distribution such as bimodality. The average particle size of the semiconductor ceramic composition present in the thermistor layer can be calculated by cutting the temperature sensor to expose a cross section of the thermistor layer, observing the exposed surface with a scanning electron microscope (SEM), and performing a statistical analysis.

The semiconductor ceramic composition powder according to the present embodiment can be obtained by subjecting the raw material mixture to a heat treatment at a relatively low temperature as described later. Therefore, the semiconductor ceramic composition powder according to the present embodiment tends to have lower hardness than a sintered body obtained by conventional high-temperature firing (for example, the sintered body described in Patent Literature 2). Therefore, an average particle diameter of 2 μm or less can be achieved by grinding. It is possible to distinguish the semiconductor ceramic composition powder according to the present embodiment and the sintered body obtained by conventional high-temperature firing, for example, by XRD measurement. The semiconductor ceramic composition powder according to the present embodiment has a peak with a local maximum around 29° to 31° of the X-ray diffraction pattern. This peak is a peak corresponding to the (220) plane of the spinel-type crystal structure, and hereinafter also referred to as "peak of the (220) plane". The half width of the peak of the (220) plane in the semiconductor ceramic composition powder according to the present embodiment tends be larger than that in the sintered body obtained by the conventional high-temperature firing, and can be, for example, 0.15 or more. On the other hand, the half width of the peak of the (220) plane in the sintered body obtained by the conventional high-temperature firing tends to be smaller than 0.15.

The specific surface area of the semiconductor ceramic composition powder is preferably 2 m$^2$/g to 12 m$^2$/g. When the specific surface area is 2 m$^2$/g or more, the connection between the powders of the semiconductor ceramic composition can be formed in an efficient manner in the thermistor layer, and the conductive path (percolation path) can be formed in an efficient manner. As a result, even when the content of the semiconductor ceramic composition powder in the thermistor layer is low, a temperature sensor can be obtained which has excellent thermistor characteristics. Furthermore, the variation in B constant can be reduced. Specifically, for example, a temperature sensor can be obtained which has a B constant of 2500 K or higher and a variation in B constant within ±2.5%. When the specific surface area is 12 m$^2$/g or less, the semiconductor ceramic composition powder can be efficiently dispersed in the thermistor layer, and the generation of coarse aggregates can be suppressed. The specific surface area of the semiconductor ceramic composition powder included in the thermistor layer can be determined by causing the organic polymer component in the thermistor layer disappear through heat treatment or the like, and measuring the specific surface area of the remaining semiconductor ceramic composition through a gas adsorption method.

The volume ratio (hereinafter also referred to as "PVC") of the semiconductor ceramic composition powder in the thermistor layer is preferably 30 vol % to 70 vol %. When the volume ratio is 30 vol % or more, a conductive path is formed with semiconductor ceramic composition powders efficiently connected to each other inside the thermistor layer, and a temperature sensor with a higher B constant can be thus obtained. According to the present embodiment, the average particle size of the semiconductor ceramic composition powder is as small as 2 μm or less, thereby making it possible to obtain a temperature sensor with a B constant of 2500 K or higher, even when the volume ratio of the semiconductor ceramic composition powder is 30 vol %. In addition, as the volume ratio of the semiconductor ceramic composition powder is higher, the resistance value of the temperature sensor can be made lower. When the volume ratio of the semiconductor ceramic composition powder is 70 vol % or less, the flexibility of the thermistor layer can be further improved. The value of the PVC can be calculated by using the following formula.

[Mathematical Formula 1]

$$PVC\ (\%) = \frac{(\text{Volume of Semiconductor Ceramic Composition Powder})}{(\text{Volume of Semiconductor Ceramic Composition Powder}) + (\text{Volume of Organic Polymer Component})} \times 100$$

The volume of the semiconductor ceramic composition powder and the volume of the organic polymer component can be calculated on the basis of the values for the specific gravity of the semiconductor ceramic composition powder and the specific gravity of the organic polymer component, as well as the values for the weight of the semiconductor ceramic composition powder and organic polymer component included in the thermistor layer. The specific gravity of the semiconductor ceramic composition powder can be measured, for example, by a true specific gravity measurement method, and the specific gravity of the organic polymer component can be measured, for example, by the Archimedes method.

Alternatively, it is also possible to calculate the value of PVC through the use of the following formula, by excavating the temperature sensor in accordance with a method such as ion focus beam (FIB) to expose a cross section of the thermistor layer, separating the exposed surface into the area occupied by the semiconductor ceramic composition powder and the area occupied by the organic polymer, and calculating the areas of the respective regions (respectively referred to as "the area of the semiconductor ceramic composition" and "the area of the organic polymer component").

[Mathematical Formula 2]

$$PVC\ (\%) = \frac{(\text{Area of Semiconductor Ceramic Composition})}{(\text{Area of Semiconductor Ceramic Composition}) + (\text{Areas of Organic Polymer Component})} \times 100$$

The organic polymer component included in the thermistor layer has the function of imparting flexibility to the thermistor layer. The organic polymer component preferably includes a thermosetting resin. The inclusion of a thermosetting resin in the organic polymer component causes the organic polymer component to cure and shrink at the time of thermal curing, thereby pressing powders of the semiconductor ceramic composition against each other. Thus, the connection between the powders of the semiconductor ceramic composition in the thermistor layer can be formed in a further efficient manner, and the conductive path can be formed in a further efficient manner. As a result, a temperature sensor can be obtained which has a smaller variation in B constant. In addition, when the organic polymer component includes a thermosetting resin, the conductive path can be formed in a further efficient manner in the thermistor layer, and the resistance value of the temperature sensor can be made lower. As the thermosetting resin, for example, an epoxy resin, an epoxy acrylate resin, a phenol novolac-type epoxy resin, a phenol resin, a urethane resin, a silicone resin, a polyamide resin, a polyimide resin, or the like can be used. Any one of the above-described thermosetting resins may be used alone, or two or more thereof may be used in combination. The thermosetting resin is preferably an epoxy resin. Since the epoxy resin is relatively high in volume shrinkage ratio, the connection between the powders of the semiconductor ceramic composition can be formed in a further efficient manner, and as a result, a temperature sensor can be obtained which has a further smaller variation in B constant.

Alternatively, the organic polymeric component may include a thermoplastic resin. As the thermoplastic resin, thermoplastic resins such as polyethylene, polypropylene, polyvinyl chloride, polystyrene, polyvinyl acetate, acrylic, and polyester, polyvinyl acetal resins, polyvinyl butyral resins, fluorine-based resins, liquid crystal polymers, polyphenylsulfide resins, diallyl phthalate resins, polyvinyl alcohol resins, epoxy resins with no curing agent added, phenoxy resins with no curing agent added, and the like can be used. Any one of the above-described thermoplastic resins may be used alone, or two or more thereof may be used in combination. When the organic polymer component includes a thermoplastic resin, the flexibility of the thermistor layer can be further improved. As a result, the generation of cracks and the like in the thermistor layer can be suppressed in a further effective manner.

In any case of, as the organic polymer component, using a thermosetting resin and using a thermoplastic resin, a temperature sensor can be obtained which has a high B constant of 2,500 K or higher.

As an organic polymer component, a thermosetting resin and a thermoplastic resin may be used in combination. The combination of a thermosetting resin with a thermoplastic resin can improve the flexibility of the thermistor layer.

The organic polymer component preferably further includes a phenoxy resin, in addition to the above-described thermosetting resin or thermoplastic resin. The phenoxy resin refers to an epoxy resin that has repeating units of n=100 (molecular weight 10,000) or more, and has flexibility and has the property of being flexible. Therefore, the organic polymer component includes a phenoxy resin in addition to the thermosetting resin, thereby further improving the flexibility of the thermistor layer, and making it possible to suppress the generation of cracks and the like in the thermistor layer in a more effective manner. As the thickness of the thermistor layer is larger, there is a tendency for cracks to be more likely to be generated in the thermistor layer. Therefore, when the thickness of the thermistor layer is relatively large, the effect of adding the phenoxy resin described above is more remarkable. The organic polymer component preferably includes, for example, an epoxy resin and a phenoxy resin. In addition, in order to impart flexibility to the thermistor layer, a CTBN-modified epoxy resin, modified silicone resin, a solvent-soluble rubber component (fluorine-base rubber, etc.), or the like may be added to the organic polymer component, in place of the phenoxy resin, or in addition to the phenoxy resin.

The organic polymer component may further include a phthalic acid ester, an adipic acid ester, an aliphatic dibasic acid ester, or the like as a plasticizer that imparts flexibility to the thermistor layer. The organic polymer component may include, in addition to the above-described components, a dispersant for improving the dispersibility of the semiconductor ceramic composition, a conductivity aid for lowering the resistance of the entire thermistor layer, and the like.

The thickness of the thermistor layer is preferably 200 μm or less. When the thickness of the thermistor layer is 200 μm or less, the generation of cracks and the like can be further suppressed, and excellent flexibility can be provided. The thickness of the thermistor layer is more preferably 5 μm or more and 50 μm or less.

The composition of the electrode layer is not to be considered particularly limited as long as the electrode has favorable adhesion to the flexible substrate and has electrical conductivity, and can be formed with the use of commercially available silver paste and copper paste. The thickness of the electrode layer can be set appropriately depending on the composition of the electrode layer paste for use in the formation of the electrode layer, the application of the temperature sensor, and the like, and may be, for example, 0.1 μm or more and 50 μm or less, and is preferably 10 μm or more and 15 μm or less.

The temperature sensor according to the present embodiment may be formed on a flexible substrate. The flexible substrate preferably has favorable adhesion to an electrode layer paste and a thermistor layer paste as described later, and has a smooth surface. In addition, the heat resistance is preferably high. As the flexible substrate, for example, polyethylene terephthalate, polyester, polypropylene, polyethylene naphthalate, polyphenylene sulfide, polyimide, polyethylene, polyvinyl alcohol, polycarbonate, polystyrene, polyvinyl acetal, polyvinyl butyral, ionomer films, polyvinyl chloride, polyvinylidene chloride, polyacrylonitrile, ethylene vinyl acetate copolymers, ethylene vinyl alcohol copolymers, nylon and the like can be used.

Next, an example of a method for manufacturing a temperature sensor according to an embodiment of the present invention will be described below. However, the method for manufacturing the temperature sensor according to the present invention is not to be considered limited to the manufacturing method described below. The method for manufacturing the temperature sensor includes, generally, a step of grinding a raw material mixture, a step of heat-treating the raw material mixture to obtain a semiconductor ceramic composition, a step of grinding the semiconductor ceramic composition to obtain a semiconductor ceramic composition powder, a step of obtaining a thermistor layer paste including the semiconductor ceramic composition powder and an organic polymer component, and a step of printing with an electrode layer paste and the thermistor layer paste onto a flexible substrate to obtain the temperature sensor.

First, a raw material mixture including a powder of a Mn source, a Ni source, and a Fe source is subjected to grinding. For example, $Mn_3O_4$, $MnCO_3$, or the like may be used as the Mn source. For example, NiO, $NiCO_3$, or the like may be used as the Ni source. For example, $Fe_2O_3$ or the like may be used as the Fe source. These respective raw materials are weighed such that the molar ratio of Mn to Ni is $85/15 \geq Mn/Ni \geq 65/35$, and when the total molar quantity of Mn and Ni is regarded as 100 parts by mole, the Fe content is 30 parts by mole or less, thereby providing a raw material mixture. It is to be noted that the composition ratio of each element in the raw material mixture can be conveniently considered substantially equal to the composition of each element in the semiconductor ceramic composition powder included in the thermistor layer of the obtained temperature sensor. This raw material mixture is subjected to grinding. The method for grinding the raw material mixture is not to be considered particularly limited, and for example, may be subjected to wet grinding together with a grinding medium (for example, a grinding medium composed of zirconia) with the use of a ball mill.

The raw material mixture subjected to grinding in this manner is heat-treated at a temperature of 700° C. or higher and 900° C. or lower, thereby providing a semiconductor ceramic composition. In the method according to the present embodiment, the proportions of the elements constituting the raw material mixture are designed as described above, thereby making it possible to obtain a semiconductor ceramic composition which has a spinel structure and a large B constant, even with a relatively low heat treatment temperature of less than 1000° C. Furthermore, the variation in B constant in the obtained temperature sensor can be reduced, because of the low abundance of different phase in the semiconductor ceramic composition obtained by the heat treatment described above. The heat treatment is preferably performed in the air. The heat treatment is performed in the air, thereby making it possible to inhibit the growth of particles of the semiconductor ceramic composition. Alternatively, when the suppressed formation of different phases is desired, the heat treatment may be performed in a nitrogen atmosphere or an oxygen atmosphere. In the case of performing the heat treatment in the atmosphere changed, the oxygen partial pressure may be changed appropriately in order to obtain a desired semiconductor ceramic composition.

The above-described semiconductor ceramic composition is subjected to grinding to obtain a semiconductor ceramic composition powder of 2 μm or less in average particle size. In the method according to the present embodiment, the heat treatment of the semiconductor ceramic composition is performed at a relatively low temperature, thus making it possible to decrease the hardness of the obtained semiconductor ceramic composition. Therefore, it is possible to make the semiconductor ceramic composition fine by grinding, and it is possible to obtain a semiconductor ceramic composition powder of 2 μm or less in average particle size.

The method for grinding the semiconductor ceramic composition is not to be considered particularly limited, and may be subjected to wet grinding by a ball mill method, or may be subjected to dry grinding, for example. In addition, for the grinding, additives such as a dispersant may be blended, if necessary. The semiconductor ceramic composition powder obtained by grinding may be optionally dried. The average particle size of the powder of the semiconductor ceramic composition (semiconductor ceramic composition as a raw material) before mixing with the organic polymer component and the like for the preparation of the thermistor layer paste can be determined by a laser diffraction/scattering method, and is expressed as a median diameter (D50). It is to be noted that the average particle size of the semiconductor ceramic composition powder as a raw material can be conveniently regarded as being substantially equal to the average particle size of the semiconductor ceramic composition present in the thermistor layer of the temperature sensor as a finished product.

The specific surface area of the semiconductor ceramic composition powder as a raw material is preferably 2 $m^2/g$ or more and 12 $m^2/g$ or less. When the specific surface area is 2 $m^2/g$ or more, the connection between the powders of the semiconductor ceramic composition can be formed in an efficient manner in the thermistor layer, and the conductive path (percolation path) can be formed in an efficient manner. As a result, even when the content of the semiconductor ceramic composition powder in the thermistor layer is low, a temperature sensor can be obtained which has excellent thermistor characteristics. Furthermore, the variation in B constant can be reduced. Specifically, for example, a temperature sensor can be obtained which has a B constant of 2500 K or higher and a variation in B constant within ±2.5%. When the specific surface area is 12 $m^2/g$ or less, the semiconductor ceramic composition powder can be efficiently dispersed in the thermistor layer, and the generation of coarse aggregates can be suppressed. The specific surface area of the semiconductor ceramic composition powder can be measured by a gas adsorption method. It is to be noted that the specific surface area of the semiconductor ceramic composition powder before the preparation of the thermistor layer paste can be conveniently regarded as being substantially equal to the specific surface area of the semiconductor ceramic composition present in the thermistor layer of the temperature sensor as a finished product.

In addition, when the specific surface area of the semiconductor ceramic composition powder is 2 $m^2/g$ or more, the content of the semiconductor ceramic composition powder in the thermistor layer can be reduced, and the content of the organic polymer component in the thermistor layer can be thus increased. As a result, the flexibility of the thermistor layer is improved, and even when the temperature sensor is bent, cracks and the like in the thermistor layer can be prevented from being generated, thereby making it possible to function as a temperature sensor. Furthermore, when the specific surface area is 2 $m^2/g$ or less, the thickness of the thermistor layer can be reduced, and the flexibility of the thermistor layer can be further improved. In addition, when the specific surface area is 2 $m^2/g$ or more, it is possible to form the thermistor layer by a printing technique such as screen printing.

The thus obtained semiconductor ceramic composition powder and the organic polymer component are mixed to obtain a thermistor layer paste including the semiconductor ceramic composition powder and the organic polymer component. The proportions of the semiconductor ceramic composition and the organic polymer component are preferably set so that the PVC of the semiconductor ceramic composition falls within the range of 30% or more and 70% or less. The thermistor layer paste may be mixed, for example, by kneading with a mortar, or a triple roll mill or the like. The obtained thermistor layer paste may be passed through a sieve such as a stainless-steel mesh, thereby removing aggregates that can be included in the paste. The opening of the mesh can be selected appropriately depending on the size of the aggregate to be removed. Furthermore, the viscosity of the thermistor layer paste may be adjusted to a viscosity suitable for printing by stirring with a solvent added to the thermistor layer paste. The stirring method is not to be considered particularly limited as long as the method is a method capable of uniformly stirring the thermistor layer paste and the solvent, and for example, stirring may be carried out by using a rotation-revolution type stirring-defoaming machine. As the solvent, for example, ethylene glycol, cellosolve, carbitol, butyl carbitol, butyl carbitol acetate, dipropylene glycol methyl ether acetate, etc. may be used. The amount of the solvent to be added can be adjusted appropriately depending on the viscosity of the desired thermistor layer paste. It is to be noted that the content ratios of the semiconductor ceramic composition powder and organic polymer component in the thermistor layer paste can be conveniently regarded as being substantially equal to the content ratios of the semiconductor ceramic composition powder and organic polymer component in the thermistor layer of the obtained temperature sensor.

Then, the electrode layer paste and the thermistor layer paste are applied by printing into predetermined patterns on the flexible substrate to obtain a temperature sensor including a thermistor layer, a pair of electrode layers, and the flexible substrate. Commercially available silver pastes (for example, REXALPHA series manufactured by TOYOCHEM) and copper pastes can be used as the electrode layer paste. The electrode layer paste and the thermistor layer paste can be applied by printing with the use of a technique such as screen printing.

The printing thicknesses of the electrode layer paste and the thermistor layer paste can be set appropriately depending on the thicknesses of the electrode layer and thermistor layer to be formed. The printing thickness of the electrode layer paste may be set so that the thickness of the electrode layer after the heat treatment is 1 μm or more and 50 μm or less, for example. The printing thickness of the thermistor layer paste may be set so that, for example, the thickness of the thermistor layer after the heat treatment is 200 μm or less, more preferably 5 μm or more and 50 μm or less.

It is preferable to perform a heat treatment after printing with the electrode layer paste and the thermistor layer paste onto the flexible substrate. The heat treatment is performed, thereby making it possible to remove the solvent and the like included in the electrode layer paste and the thermistor layer paste. However, it is possible to remove the solvent included in the electrode layer paste and the thermistor layer paste also by drying the paste after the printing, left at room temperature. In addition, when the organic polymer component included in the thermistor layer paste is a thermosetting resin, the thermosetting resin can be cured by performing a heat treatment. In addition, in the case of using an electrode layer paste including a thermosetting resin, the thermosetting resin included in the electrode layer paste can be cured by performing a heat treatment.

The heat treatment is preferably performed every time any one of the pastes is applied by printing. For example, in the case of manufacturing a temperature sensor that has the structure shown in FIGS. 1(a) to 1(c), the electrode layer paste is applied by printing into patterns corresponding to the electrode layers 1 and 3 shown in FIG. 1(a), and subjected to a first heat treatment, and the thermistor layer paste is then applied by printing into a pattern corresponding to the thermistor layer 5 shown in FIG. 1(b), and subjected to a second heat treatment, thereby making it possible to form a thermistor layer and a pair of electrode layers. In the case of manufacturing a temperature sensor that has the structure shown in FIGS. 2(a) and 2(b), the electrode layer paste is applied by printing into a pattern corresponding to one electrode layer 11, and subjected to a first heat treatment, and the thermistor layer paste is then applied by printing into a pattern corresponding to the thermistor layer 15, and subjected to a second heat treatment, and thereafter, the electrode layer paste is applied by printing into a pattern corresponding to the other electrode layer 13, and subjected to a third heat treatment, thereby making it possible to form a thermistor layer and a pair of electrode layers. Alternatively, the thermal treatment may be performed after printing with both the electrode layer paste and the thermistor layer. This heat treatment method can reduce the number of steps.

The heat treatment described above may be carried out in a hot air oven, for example. The heat treatment conditions can be set appropriately set depending on the compositions of the electrode layer paste and thermistor layer paste to be used. For example, the heat treatment after printing with the thermistor layer paste may be performed at a temperature at which the thermistor layer is sufficiently fixed. In addition, when the organic polymer component included in the thermistor layer is a thermosetting resin, it is preferable to perform a heat treatment at or above the curing temperature of the thermosetting resin. In addition, in each heat treatment, the electrode layer paste and/or the thermistor layer paste may be dried at a relatively low temperature, and then further heated at a temperature higher than the drying temperature.

In this way, the temperature sensor according to this embodiment is obtained. The semiconductor ceramic composition powder prepared by the method described above has a spinel structure, a low content of unreacted substances, and a low abundance of different phase, preferably substantially no different phase. Therefore, the temperature sensor according to the present embodiment, which is fabricated with the use of the foregoing semiconductor ceramic composition powder, has a high B constant and excellent flexibility. Furthermore, the temperature sensor fabricated by the method described above has the advantage of small variation in B constant. The variation in B constant preferably falls within ±2.5%.

EXAMPLES

Temperature sensors according to examples 1 to 34 were prepared in accordance with the procedure described below. First, respective powders of $Mn_3O_4$, $Fe_2O_3$, $NiO$, $Co_3O_4$, $Al_2O_3$, and $TiO_2$ were prepared as ceramic raw materials, and these powders were weighed so as to have compositions as shown in Tables 1 and 2, thereby providing a raw material mixture. In Table 1, in each column of "Mn" and "Ni", the percentage of the molar quantity of Mn and the percentage of the molar quantity of Ni with respect to the total molar quantity of Mn and Ni are respectively shown, which are obtained when $Mn_3O_4$ and $NiO$ are respectively converted to Mn and Ni, and in the columns of "Fe", "Co", "Al", and "Ti", the $Fe_2O_3$ content (in terms of Fe), the $Co_3O_4$ content (in terms of Co), the $Al_2O_3$ content (in terms of Al), and the $TiO_2$ content (in terms of Ti) are shown, which are obtained when the total molar quantity of $Mn_3O_4$ (in terms of Mn) and NiO (in terms of Ni) are regarded as 100 parts by mole. It is to be noted that "*" in the table indicates a comparative example.

Then, the above-described raw material mixture was put into a ball mill, and sufficiently subjected to wet grinding together with a grinding medium made of zirconia. The ground raw material mixture was heat-treated at a temperature of 730° C. for 2 hours to obtain a semiconductor ceramic composition.

The obtained semiconductor ceramic composition, pure water, and cobblestones of 2 mm in diameter were put in a 1 L poly pot, and subjected to grinding for 4 hours at 110 rpm by a ball mill method. The ground slurry and the cobblestones were separated through a mesh, and the slurry was poured onto a hot plate to remove moisture. Furthermore, coarse particles were removed by passing through a mesh, and the agglomerates were subjected to granulating by fracturing. Then, the slurry was dried at a temperature of 80° C. for 24 hours to obtain a semiconductor ceramic composition powder. The semiconductor ceramic composition powder according to the examples 1 to 17 was subjected to XRD measurement. For each example, the peak intensity was determined for each of the XRD peak (spinel peak) around about 35°, associated with the spinel structure, the XRD peak (NiO peak) around about 44°, associated with unreacted NiO (different phase), and the XRD peak ($Mn_2O_3$ peak) around about 38°, associated with unreacted $Mn_2O_3$ (different phase), and the XRD peak ratio of the NiO peak to the spinel peak and the XRD peak ratio of the $Mn_2O_3$ peak to the spinel peak were determined. The results are shown in Table 1. It is to be noted that in the columns of the XRD peak ratio in the table, "–" means that the peak of a different phase was not detected, or overlapped with another peak.

Furthermore, the semiconductor ceramic composition powders according to the examples 20, 24, 28 and 32 were also subjected to the XRD measurement. For each example, the half width was determined for the peak (the peak of (220) plane)) around 29° to 31° corresponding to the (220) plane of the spinel-type crystal structure. The results are shown in Table 2. In addition, for comparison, raw material mixtures prepared so as to have the same composition as in the examples 24, 28 and 32 were subjected to wet grinding, and firing at 1000° C. to 1300° C. to obtain sintered bodies. These sintered bodies are referred to as a "sintered body of example 24", a "sintered body of example 28" and a "sintered body of example 32", respectively. The sintered bodies of examples 24, 28 and 32 were each subjected to the XRD measurement, thereby determining the half width of the peak of the (220) plane. The results are shown in Table 2. As shown in Table 2, in the semiconductor ceramic compositions of examples 20, 24, 28 and 32 obtained by the heat treatment at 730° C., the peak of the (220) plane was larger than 0.15 in the value of the half width. In contrast, in the sintered bodies of examples 24, 28 and 32 obtained by firing at high temperatures of 1000° C. to 1300° C., the peak of the (220) plane was smaller than 0.15 in the value of the half width.

The obtained semiconductor ceramic composition powder, an organic polymer component (epoxy resin and phenoxy resin), and a solvent were subjected to kneading in a mortar to obtain a thermistor layer paste. DPMA (dipropylene glycol methyl ether acetate) was used as the solvent. The proportions of the semiconductor ceramic composition powder and the organic polymer component in the thermistor layer paste were adjusted to cause the PVC of the semiconductor ceramic composition powder to fall within the range of 30% or more and 70% or less. The contents of the epoxy resin and the phenoxy resin were adjusted so as to be 47:53 in ratio by weight. The solvent was added in an amount of about 25 wt % of the total weight of the semiconductor ceramic composition powder and the organic polymer component.

The electrode layer paste and the thermistor layer paste were applied onto a flexible substrate by a screen printing method, and heat-treated to form a temperature sensor with a sandwich structure as shown in FIGS. 2(a) and 2(b). A commercially available silver paste (REXALPHA series manufactured by TOYOCHEM) was used as the electrode layer paste, and a PET film was used as the flexible substrate. First, the above-described electrode layer paste including silver particles was applied by printing into a pattern corresponding to one electrode layer 11, and subjected to a heat treatment at 130° C. for 30 minutes under the air atmosphere. Then, the thermistor layer paste was applied by printing into a pattern corresponding to the thermistor layer 15, and heat treatment was subjected to a heat treatment at 150° C. for 1 hour under the air atmosphere. The electrode layer paste was applied thereon by printing into a pattern corresponding to the other electrode layer 13, and subjected to a heat treatment at 130° C. for 30 minutes under the air atmosphere. In this way, the temperature sensors according to the examples 1 to 34 were obtained.

Liquid tanks filled with Fluorinert (registered trademark) respectively at temperatures of 25° C. and 50° C. were prepared, and the temperature sensors were immersed in each liquid tank to measure the resistances. In addition, the B constants were calculated on the basis of the resistance values at 25° C. and 50° C. The results are shown in Tables 1 and 2 below. It is to be noted that the resistivity value in the table indicates the logarithm $\log \rho$ of the resistivity value $\rho$ ($\Omega \cdot cm$) at 25° C.

For each of the examples 1 to 17, five thermistors per 150 $mm^2$ PET film were formed, and three films in total, that is, fifteen temperature sensors were prepared. The B constant of each temperature sensor was measured, and the average value was obtained for each example. For each example, MAX (%) and MIN (%) were calculated from the following formulas with the use of the calculated average value, and the value of (MAX (%)+MIN (%)) was defined as a variation of B constant.

[Mathematical Formula 3]

$$MAX\ (\%) = \frac{(\text{Maximum Value of } B \text{ Constant}) - (\text{Average Value of } B \text{ Constant})}{(\text{Average Value of } B \text{ Constant})} \times 100$$

[Mathematical Formula 4]

$$MIN\ (\%) = \frac{(\text{Average Value of } B \text{ Constant}) - (\text{Minimum Value of } B \text{ Constant})}{(\text{Average Value of } B \text{ Constant})} \times 100$$

Table 1 shows the results of calculating the variations of the B constants.

TABLE 1

| | Mn (mol %) | Ni (mol %) | Fe (mol %) | B Constant (K) | Variation in B Constant (%) | Resistivity Logarithm log ρ | Spinel/NiO (Different Phase) XRD Peak Ratio | Spinel/Mn₃O₄ (Different Phase) XRD Peak Ratio |
|---|---|---|---|---|---|---|---|---|
| 1* | 100 | 0 | 20 | 7682 | 5.3 | 12 | — | 2 |
| 2* | 95 | 5 | 20 | 6522 | 4.3 | 11 | — | 1.7 |
| 3* | 95 | 5 | 35 | 5610 | 1.5 | 11 | — | — |
| 4* | 90 | 10 | 20 | 5406 | 3.6 | 10.5 | — | 1.6 |
| 5* | 87 | 13 | 20 | 5114 | 5.4 | 10.1 | — | 1.7 |
| 6 | 85 | 15 | 20 | 4951 | 1.3 | 7.3 | — | 0.5 |
| 7 | 75 | 25 | 0 | 3839 | 1.1 | 6.2 | — | 0.22 |
| 8 | 75 | 25 | 5 | 3835 | 1.7 | 6.2 | — | 0.13 |
| 9 | 75 | 25 | 20 | 3932 | 1.8 | 7.4 | — | 0.08 |
| 10 | 75 | 25 | 25 | 4068 | 1 | 7.6 | — | — |
| 11* | 75 | 25 | 33 | 3516 | 0.8 | 8.5 | — | — |
| 12 | 70 | 30 | 20 | 3536 | 0.9 | 6.4 | — | — |
| 13 | 67 | 33 | 20 | 3359 | 0.7 | 6.2 | — | — |
| 14 | 65 | 35 | 20 | 3300 | 0.4 | 6 | 0.25 | — |
| 15* | 60 | 40 | 0 | 3860 | 2.5 | 6.4 | 0.43 | — |
| 16* | 60 | 40 | 20 | 3240 | 2.3 | 6 | 0.36 | — |
| 17* | 60 | 40 | 33 | 3066 | 3.7 | 6 | 0.29 | — |

TABLE 2

| | Mn (mol %) | Ni (mol %) | Fe (mol %) | Co (mol %) | Al (mol %) | Ti (mol %) | B Constant (K) | Resistivity Logarithm log ρ | Half Width (220) plane Method according to Embodiment | Half Width (220) plane Sintered Body |
|---|---|---|---|---|---|---|---|---|---|---|
| 18 | 81 | 19 | 6 | 20 | — | — | 4268 | 7.8 | | |
| 19 | 81 | 19 | 6 | 34 | — | — | 4095 | 6.7 | | |
| 20 | 81 | 19 | 6 | 54 | — | — | 3723 | 5.9 | 0.5438 | |
| 21 | 78 | 22 | 0 | — | 2 | — | 3856 | 6.1 | | |
| 22 | 78 | 22 | 0 | — | 5 | — | 3877 | 6.6 | | |
| 23 | 78 | 22 | 0 | — | 10 | — | 3994 | 7.2 | | |
| 24 | 78 | 22 | 0 | — | 13 | — | 4022 | 8.1 | 0.1994 | 0.141 |
| 25 | 78 | 22 | 0 | — | 16 | — | 4052 | 8.5 | | |
| 26 | 70 | 30 | 20 | 2 | — | — | 3984 | 7.5 | | |
| 27 | 70 | 30 | 20 | 3 | — | — | 3659 | 6.9 | | |
| 28 | 70 | 30 | 20 | 8 | — | — | 3357 | 6.2 | 0.184 | 0.148 |
| 29 | 70 | 30 | 20 | — | — | 15 | 3215 | 5.9 | | |
| 30 | 70 | 30 | 20 | — | — | 30 | 3044 | 5.6 | | |
| 31 | 70 | 30 | 2 | — | — | 2.0 | 3765 | 6.1 | | |
| 32 | 70 | 30 | 2 | — | — | 5.6 | 3906 | 6.6 | 0.289 | 0.142 |
| 33 | 70 | 30 | 2 | — | — | 8.0 | 4056 | 7.0 | | |
| 34 | 70 | 30 | 2 | — | — | 11.5 | 4359 | 7.3 | | |

From the results of the examples 1 to 6 shown in Table 1, it is found that when the molar ratio Mn/Ni of Mn to Ni in the semiconductor porcelain composition is larger than 85/15, the variation of B constant is increased, thereby increasing the value of the resistivity. This is believed to be due to deposition of unreacted Mn₂O₃ in the semiconductor ceramic composition. In addition, from the results of the examples 12 to 17, it is found that when the molar ratio Mn/Ni of Mn to Ni is smaller than 65/35, the variation of the B constant is increased. This is believed to be due to deposition of unreacted NiO in the semiconductor ceramic composition. Furthermore, from the results of the examples 7 to 11, it has been determined that the resistivity value tends to be higher as the Fe content in the semiconductor ceramic composition is higher, and the tendency is particularly remarkable when the Fe content exceeds 30 parts by mol, with the total molar quantity of Mn and Ni regarded as 100 parts by mol.

From Table 2, it has been confirmed that temperature sensors with the high B constants were obtained even when Co, Al or Ti was added to the semiconductor ceramic compositions.

Figure 3:
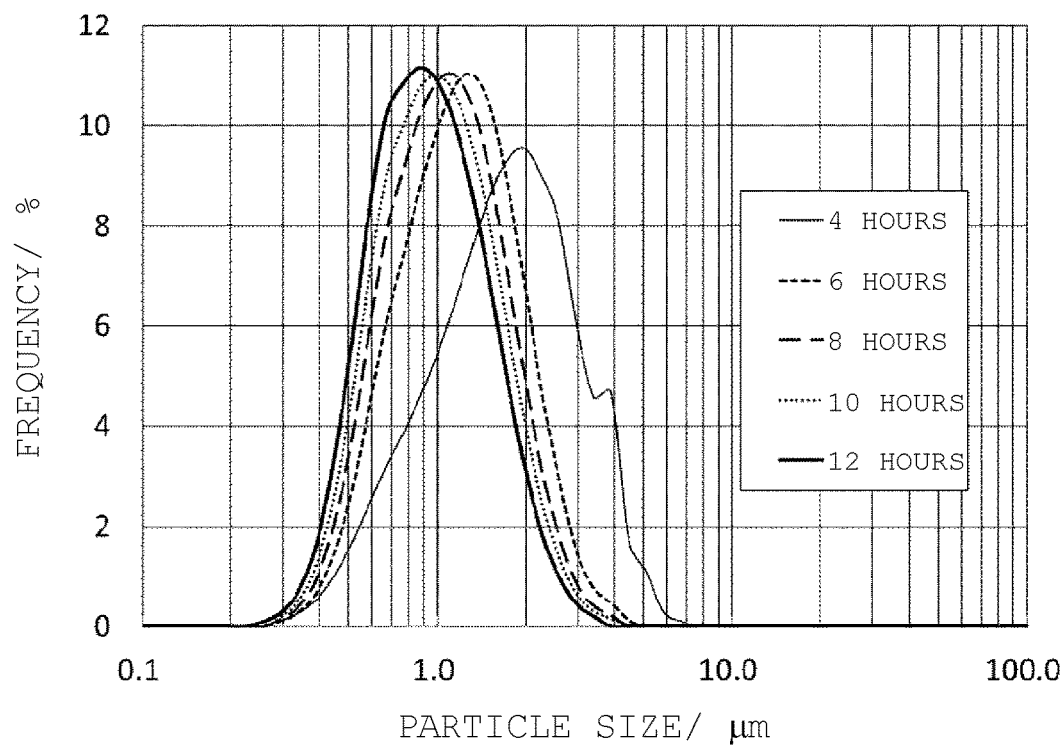
FIG. 3 is a graph showing the relationship between the grinding time and particle size of a semiconductor ceramic composition powder according to an example.

Next, a semiconductor ceramic composition with the same composition as that of the semiconductor ceramic composition in the example 24, pure water, and cobblestones of 2 mm in diameter were put into a 1 L poly pot, and subjected to grinding at 110 rpm by a ball mill method. The grinding time was varied between 4 and 12 hours. The ground slurry and the cobblestones were separated through a mesh, and the slurry was poured onto a hot plate to remove moisture. Furthermore, coarse particles were removed by passing through a mesh, and the agglomerates were subjected to granulating by fracturing. Then, the slurry was dried at a temperature of 80° C. for 24 hours to obtain a semiconductor ceramic composition powder. The particle size distribution of the semiconductor ceramic composition powder was measured by a laser diffraction method with the use of a laser diffraction/scattering type particle size distribution measurement system LA-960 manufactured by Horiba, Ltd. The results are shown in FIG. 3. From FIG. 3, it has been found that the increased grinding time can reduce the particle size of the semiconductor ceramic composition powder, thereby achieving an average particle size of 2 μm or less.

For the semiconductor ceramic composition powders of the examples 20, 24, and 28, the specific surface areas were measured by a gas adsorption method. As a result of the measurement, the specific surface area of the semiconductor ceramic composition powder of the example 20 was 4.95 m$^2$/g, the specific surface area of the semiconductor ceramic composition powder of the example 24 was 6.10 m$^2$/g, and the specific surface area of the semiconductor ceramic composition powder of the example 28 was 10.35 m$^2$/g. It has been confirmed that any of the semiconductor ceramic composition powders was 2 to 12 m$^2$/g in specific surface area.

Figure 4:
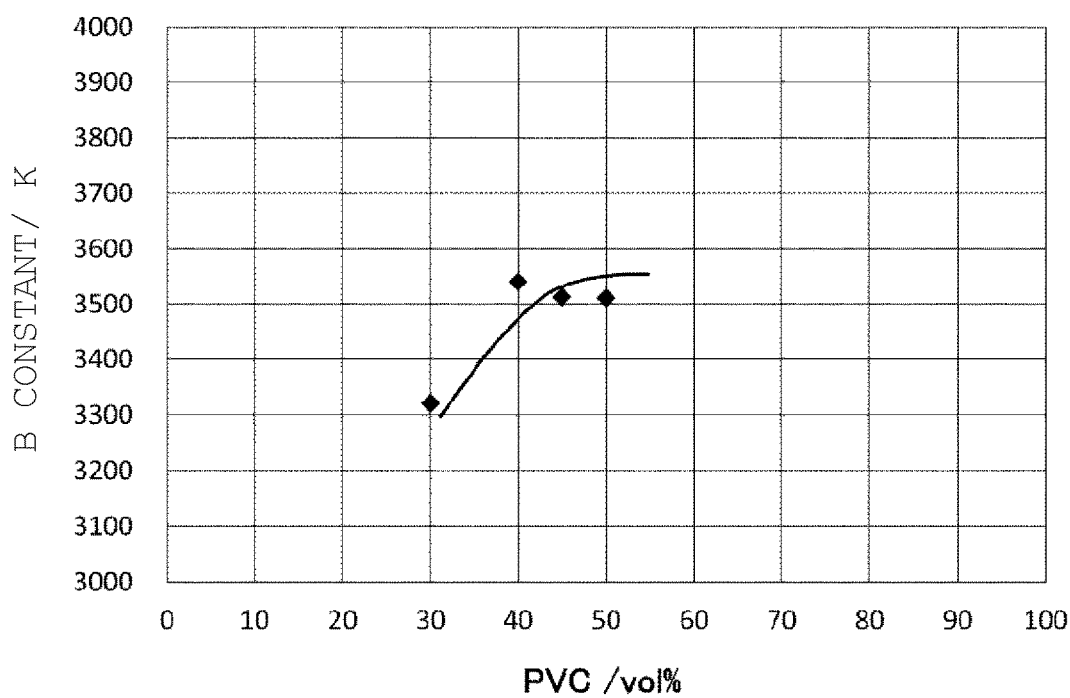
FIG. 4 is a graph showing the relationship between the volume ratio of a semiconductor ceramic composition powder and the B constant in a thermistor layer of a temperature sensor according to an example.

Through the use of a semiconductor ceramic composition with the same composition as that of the example 28, a sandwich-type temperature sensor was fabricated by the method described above. The PVC of the semiconductor ceramic composition powder in the thermistor layer was varied between 30 and 50 vol %. For these temperature sensors, the resistance values were measured by the above-mentioned method, and the B constants were obtained. The results are shown in FIG. 4. From FIG. 4, it has been confirmed that temperature sensors with high B constants of 3300 K or higher were obtained with the PVC in the range of 30 vol % or more and 50 vol % or less.

With the use of the semiconductor ceramic composition powders of the examples 20, 24 and 28, temperature sensors including comb-like electrode layers as shown in FIG. 1(a) were fabricated. First, an electrode layer paste including silver particles was applied onto a flexible substrate by a screen printing method, and heat-treated at 130° C. for 30 minutes under the air atmosphere to form comb-like electrodes as shown in FIG. 1(a). A commercially available silver paste (REXALPHA series manufactured by TOYOCHEM) was used as the electrode layer paste, and a PET film was used as the flexible substrate. The thickness of the electrode layer after the heat treatment was about 10 μm, the length of the long side of the electrode layer was 2.5 mm, the length of the short side thereof was 1.5 mm, the width of the electrode wire was 50 μm, and the interval between the electrode wires was 50 μm.

On the comb-like electrode layer described above, a thermistor layer was applied by a screen printing method, dried at 80° C. for 10 minutes under the air atmosphere, and then heat-treated at 150° C. for 1 hour, thereby forming a thermistor layer as shown in FIG. 1(b). The thickness of the thermistor layer after the heat treatment was about 15 μm. In this way, the temperature sensors with the comb-like electrode layers were obtained.

For the three kinds of temperature sensors described above, the resistance measurement was performed in accordance with the same procedure as the method described above, and the B constants were calculated on the basis of the resistance values at 25° C. and 50° C. The results are shown in Table 3. In Table 3, the B constants of the temperature sensors which have the sandwich structure described above are also shown in addition to the test results regarding the temperature sensors with the comb-like electrode layers. From Table 3, it is found that the temperature sensors with the comb-like electrode layers successfully achieved the high B constants as with the temperature sensors with the sandwich structure.

TABLE 3

|  | B Constant (K) | |
|---|---|---|
|  | Comb-like Shape | Sandwich Structure |
| Example 20 | 3510 | 3723 |
| Example 24 | 4270 | 4022 |
| Example 28 | 3479 | 3357 |

Through the use of a semiconductor ceramic composition powder with the same composition as that of the example 28, temperature sensors according to examples 35 to 39 with a sandwich structure were fabricated by the method described above. The dimensions of the part with the electrode layers opposed (the dimensions of the long side 111 and short side 112 shown in FIG. 2(a)) were set to the values shown in Table 4. For each example, the total thickness of the temperature sensor was set to be about 26 μm.

TABLE 4

|  | Dimensions of Opposed Part (mm) | |
|---|---|---|
|  | Long Side | Short Side |
| Example 35 | 8.0 | 5.0 |
| Example 36 | 5.6 | 3.6 |
| Example 37 | 4.0 | 2.5 |
| Example 38 | 2.8 | 1.8 |
| Example 39 | 2.0 | 1.2 |

Figure 5:
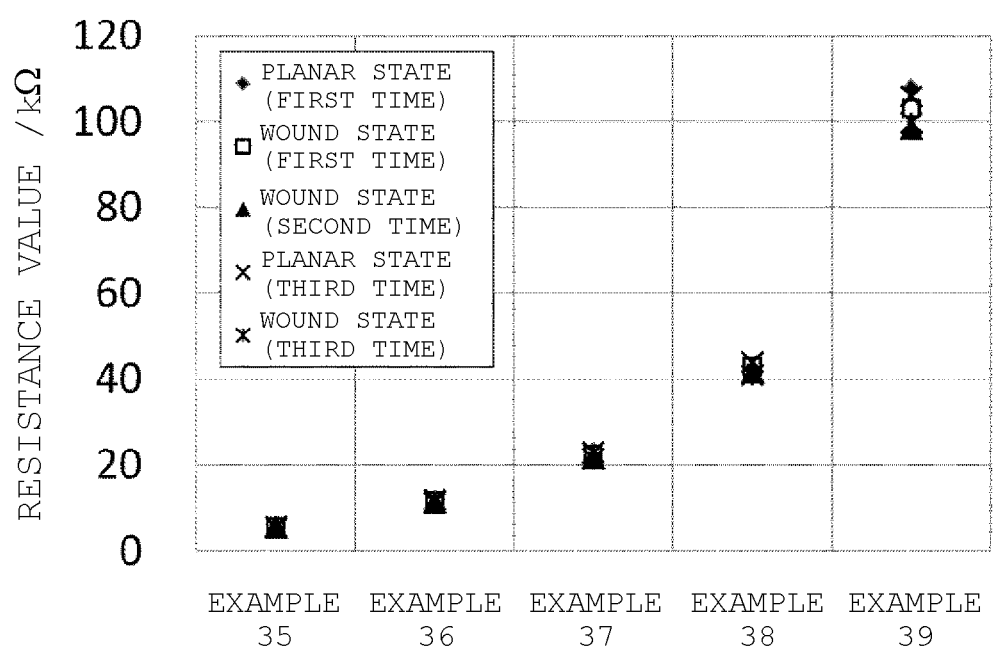
FIG. 5 is a graph showing flexibility test results of temperature sensors according to examples.

For these temperature sensors, the flexibility was checked. First, the resistance value of the temperature sensor was measured while the flexible substrate with the temperature sensor formed was maintained to be planar. Then, the resistance value of the temperature sensor was measured while the flexible substrate was wound around a pencil of φ 8 mm such that temperature sensor was wound. Then, the resistance value of the temperature sensor was measured while the flexible substrate was maintained to be planar again. In this manner, while repeating the planar state and the wound state three times, the resistance value of the temperature sensor in each state was measured. The resistance values were also measured at 25° C. The results are shown in FIG. 5. From FIG. 5, it has been confirmed that the temperature sensors according to the examples 35 to 39 all exhibited favorable flexibility, almost without change in resistance value when the wound state was repeated.

Through the use of a semiconductor ceramic composition powder with the same composition as that of the example 28, temperature sensors according to examples 40 to 52 with a comb-like structure were fabricated in accordance with the same procedure as the method described above. For each example, the heat treatment for the thermistor layer paste was carried out under the conditions shown in Table 5. As the organic polymer component, the resins shown in Table 5 were used. The volume ratio (PVC) of the semiconductor ceramic composition powder was set to 46 vol %. For the obtained temperature sensors according to the examples 40 to 52, the resistance measurement was performed in accordance with the same procedure as the method described above, and the B constants were calculated on the basis of the resistance values at 25° C. and 50° C. The results are shown in Table 5.

TABLE 5

| Example | Resin | | Heat Treatment Conditions | B Constant (K) |
|---|---|---|---|---|
| 40 | Thermosetting Resin | Epoxy Resin | 150° C. 1 hour | 3236 |
| 41 | | Epoxy Acrylate Resin | 150° C. 1 hour | 3250 |
| 42 | | Phenol Novolac-type Epoxy Resin | 150° C. 1 hour | 3205 |
| 43 | | Phenol Resin | 150° C. 1 hour | 3239 |
| 44 | | Urethane Resin | 150° C. 1 hour | 3340 |
| 45 | | Silicone Resin | 135° C. 1 hour | 3050 |
| 46 | | Polyamide Resin | 150° C. 1 hour | 3259 |
| 47* | | Polyimide Resin | 200° C. 1 hour | 3020 |
| 48 | Thermoplastic Resin | Polyvinyl Butyral Resin | 70° C. 1 hour | 3130 |
| 49 | | Epoxy Resin with No Curing Agent added | 80° C. 1 hour | 3749 |
| 50 | | Phenoxy Resin with No Curing Agent added | 80° C. 1 hour | 3710 |
| 51 | | Polyester | 80° C. 1 hour | 3345 |
| 52 | | Polyvinyl Acetate | 80° C. 1 hour | 4428 |

In the examples marked with *, a polyimide film was used as a flexible substrate.

As shown in Table 5, the temperature sensors with the high B constants of 3000 K or higher were obtained when any of the resins was used as the organic polymer component.

The temperature sensor according to the present invention has a high B constant and excellent flexibility, and can be thus applied to electronic devices which require a small-size and high-performance temperature sensor.

DESCRIPTION OF REFERENCE SYMBOLS

1: Electrode layer
3: Electrode layer
101: Long side of electrode layer
102: Short side of electrode layer
5: Thermistor layer
7: Flexible substrate
L: Width of electrode wire
S: Interval between electrode wires
11: Electrode layer
13: Electrode layer
111: Long side of electrode layer
112: Short side of electrode layer
15: Thermistor layer
17: Flexible substrate

The invention claimed is:

1. A temperature sensor comprising:
a first electrode layer;
a second electrode layer; and
a thermistor layer between the first electrode layer and the second electrode layer, the thermistor layer comprising a spinel semiconductor ceramic composition powder containing Mn, Ni, and Fe, and an organic polymer component,
wherein
in the spinel semiconductor ceramic composition powder, a molar ratio of Mn to Ni is 85/15≥Mn/Ni≥65/35, and when a total molar quantity of Mn and Ni is 100 parts by mol, a content of Fe is 30 parts by mol or less, and
the spinel semiconductor ceramic composition powder has a peak corresponding to a (220) plane thereof in an X-ray diffraction pattern, and the peak has a half width of 0.15 or more.

2. The temperature sensor according to claim 1, wherein the spinel semiconductor ceramic composition powder is 2 μm or less in average particle size.

3. The temperature sensor according to claim 1, wherein the spinel semiconductor ceramic composition powder further comprises one or more selected from the group of Co, Ti, and Al, and
when the total molar quantity of Mn and Ni is 100 parts by mole, a content of Co, Ti, and Al is 2.0 to 60 parts by mole in total.

4. The temperature sensor according to claim 1, wherein the spinel semiconductor ceramic composition powder has a specific surface area of 2 m$^2$/g to 12 m$^2$/g.

5. The temperature sensor according to claim 1, wherein the spinel semiconductor ceramic composition powder has a volume ratio in the thermistor layer of 30 vol % to 70 vol %.

6. The temperature sensor according to claim 1, wherein the organic polymer component comprises a thermosetting resin.

7. The temperature sensor according to claim 6, wherein the thermosetting resin is at least one resin selected from the group of an epoxy resin, an epoxy acrylate resin, a phenol novolac-type epoxy resin, a phenol resin, a urethane resin, a silicone resin, a polyamide resin and a polyimide resin.

8. The temperature sensor according to claim 6, wherein the organic polymer component further comprises a phenoxy resin.

9. The temperature sensor according to claim 1, wherein the organic polymer component comprises a thermoplastic resin.

10. The temperature sensor according to claim 9, wherein the thermoplastic resin is at least one resin selected from the group of a polyvinyl butyral resin, an epoxy resin with no curing agent added, a phenoxy resin with no curing agent, a polyester, and a polyvinyl acetate.

11. The temperature sensor according to claim 1, wherein the thermistor layer is 200 μm or less in thickness.

12. The temperature sensor according to claim 1, wherein the first electrode layer and the second electrode layer are arranged along a same plane of the temperature sensor.

* * * * *